United States Patent
Nagano et al.

(10) Patent No.: US 7,860,714 B2
(45) Date of Patent: Dec. 28, 2010

(54) DETECTION SYSTEM FOR SEGMENT INCLUDING SPECIFIC SOUND SIGNAL, METHOD AND PROGRAM FOR THE SAME

(75) Inventors: Hidehisa Nagano, Sagamihara (JP); Takayuki Kurozumi, Zama (JP); Kunio Kashino, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 987 days.

(21) Appl. No.: 10/586,192

(22) PCT Filed: Jul. 1, 2005

(86) PCT No.: PCT/JP2005/012223
§ 371 (c)(1),
(2), (4) Date: Feb. 15, 2007

(87) PCT Pub. No.: WO2006/004050
PCT Pub. Date: Jan. 12, 2006

(65) Prior Publication Data
US 2007/0156401 A1    Jul. 5, 2007

(30) Foreign Application Priority Data
Jul. 1, 2004   (JP)   ............................. 2004-195995

(51) Int. Cl.
*G10L 15/08* (2006.01)
(52) U.S. Cl. .............. 704/239; 704/203; 704/200.1; 704/241; 704/209; 704/500
(58) Field of Classification Search ............. 704/203, 704/239, 233, 200, 251, 205, 209, 241, 201, 704/500–504, 200.1
See application file for complete search history.

(56) References Cited

U.S. PATENT DOCUMENTS
4,881,266 A * 11/1989 Nitta et al. ................. 704/253
(Continued)

FOREIGN PATENT DOCUMENTS
EP      788648 A2    8/1997
(Continued)

OTHER PUBLICATIONS

Hidehisa Nagano et al., "Similar Music Retrieval Using Polyphonic Binary Feature Vectors and Its Acceleration," Institute of Electronics, Information and Communication Engineers, D-II, Nov. 1, 2003, vol. J86-DII, No. 11, pp. 1657-1667 [equivalent to H. Nagano, et al., "Fast Music Retrieval Using Polyphonic Binary Feature Vectors", ICM 2002, vol. I, pp. 101-140, also attached].

(Continued)

*Primary Examiner*—Vijay B Chawan
(74) *Attorney, Agent, or Firm*—Harness, Dickey, Pierce, P.L.C.

(57) ABSTRACT

The present invention is a detection system of a segment including specific sound signal which detects a segment in a stored sound signal similar to a reference sound signal, including: a reference signal spectrogram division portion which divides a reference signal spectrogram into spectrograms of small-regions; a small-region reference signal spectrogram coding portion which encodes the small-region reference signal spectrogram to a reference signal small-region code; a small-region stored signal spectrogram coding portion which encodes a small-region stored signal spectrogram to a stored signal small-region code; a similar small-region spectrogram detection portion which detects a small-region spectrogram similar to the small-region reference signal spectrograms based on a degree of similarity of a code; and a degree of segment similarity calculation portion which uses a degree of small-region similarity and calculates a degree of similarity between the segment of the stored signal and the reference signal.

13 Claims, 7 Drawing Sheets

U.S. PATENT DOCUMENTS

| | | | | |
|---|---|---|---|---|
| 5,611,019 A | * | 3/1997 | Nakatoh et al. | 704/233 |
| 5,749,073 A | * | 5/1998 | Slaney | 704/278 |
| 5,933,806 A | | 8/1999 | Beyerlein | |
| 6,138,089 A | * | 10/2000 | Guberman | 704/207 |
| 6,263,311 B1 | * | 7/2001 | Dildy | 704/273 |
| 7,054,388 B2 | * | 5/2006 | Kurozumi et al. | 375/340 |

FOREIGN PATENT DOCUMENTS

| | | |
|---|---|---|
| JP | 10-508391 A | 8/1998 |
| JP | 2000-312343 | 11/2000 |
| JP | 2002-044610 | 2/2002 |
| JP | 2002-236496 A | 8/2002 |
| JP | 2003-022084 A | 1/2003 |
| JP | 2003-242510 A | 8/2003 |
| JP | 2004-102023 A | 4/2004 |
| WO | WO-97/08685 A2 | 3/1997 |
| WO | WO-02/11123 | 2/2002 |
| WO | 02/073593 A1 | 9/2002 |

PUBLICATIONS

Hideo Nagano et al., "Tasu no Shoryoiki Spectrogram no Kensaku ni Motozuku Haikei Ongaku no Kosoku Tansakuho", The Transactions of the Institute of Electronics, Information and Communication Engineers D-II, May 1, 2004, vol. J87-D-II, No. 5, pp. 1179-1188.

Shogo Kimura et al., "Global na Edakari o Donyu shita Chojikan Onkyo Shingo no Tansaku—Jikeiretsu Active Tansaku no Koritsuka -", The Institute of Electronics, Information and Communication Engineers Gijutsu Kenkyu Hokoku, Feb. 16, 2001, vol. 100, No. 634, pp. 53 to 60.

Kashino, K., et al.: "A Quick Search Algorithm for Acoustic Signals Using Histogram Features—Time-Series Active Search," Electronics & Communications in Japan, Part III—Fundamental Electronic Science, Wiley, Hoboken, NJ, US, vol. 84, No. 12, Part 03, Dec. 1, 2001, pp. 40-47.

Nagano, H., et al.: "A Fast Search Algorithm for Background Music Signals Based on the Search for Numerous Small Signal Components," IEEE International Conference on Acoustics, Speech, and Signal Processing, Proceedings (ICASSP), Hong Kong, Apr. 6-10, 2003; [IEEE International Conference on Acoustics, Speech, and Signal Processing (ICASSP)], New York, NY: IEEE, US, vol. 5, Apr. 6, 2003, pp. V_796-V_799.

Kimura, A. et al.: "Very Quick Audio Searching: Introducing Global Pruning to the Time-Series Active Search," 2001 IEEE International Conference on Acoustics, Speech, and Signal Processing, Proceedings (ICASSP), Salt Lake City, UT, May 7-11, 2001; [IEEE International Conference on Acoustics, Speech, and Signal Processing (ICASSP)], New York, NY: IEEE, US, vol. 3, May 7, 2001, pp. 1429-1432.

"A Quick Search Algorithm for Acoustic Signals Using Histogram Features—Time-Search Active Search", Kashino, et al., The Transactions of the Institute of Electronics, Information and Communication Engineers, D-11, vol. J82-D-II. No. 9, pp. 1365-1373, Sep. 1999.

"Self-Optimized Spectral Correlation Method for Background Music Identification", Abe, et al., The Institute of Electronics, Information and Computer Engineers, Technical Report of IEICE, No. PRMU2001-209, pp, 25-30, Jan. 18, 2002.

"Self-Optimized Spectral Correlation Method for Background Music Identification", Abe, et al., Proc. IEEE ICME '02, Lausanne, vol. 1, 333/336 (2002).

"A Search Algorithm for Background Music Signals Based on the Search for Numerous Small Area Signals", Nagano, et al.. The Institute of Electronics, Information and Computer Engineers, Technical Report of IEICE. No. PRMU2002-86, WIT2002-29, pp. 37-41, Sep. 20, 2002.

* cited by examiner

$$\begin{pmatrix} \nu(\omega 1,1,1) & \nu(\omega 1,1,2) & \cdots \\ \nu(\omega 1,2,1) & \nu(\omega 1,2,2) & \cdots \\ \vdots & \vdots & \ddots \end{pmatrix}$$

$$\begin{pmatrix} \nu(\omega 2,1,1) & \nu(\omega 2,1,2) & \cdots \\ \nu(\omega 2,2,1) & \nu(\omega 2,2,2) & \cdots \\ \vdots & \vdots & \ddots \end{pmatrix}$$

$\vdots$

FIG. 4 q($\omega$1,1) → | TIME | TIME | TIME | TIME | · · · q($\omega$1,2) → | TIME | TIME | TIME | TIME | · · · q($\omega$2,1) → | TIME | TIME | TIME | TIME | · · · q($\omega$3,1) → | TIME | TIME | TIME | TIME | · · ·

(a) DIVIDE SPECTROGRAMS OF REFERENCE SIGNAL INTO SMALL-REGION SPECTROGRAMS (b) DETECT SMALL-REGION SPECTROGRAMS SIMILAR TO EACH $F_{ti,\omega m}$ USIG TAS FROM SPECTROGRAMS OF STORED SIGNAL (c) CALCULATE DEGREE OF SEGMENT SIMILARITY $S'(t)$

FIG. 8

PRIOR ART

DETECTION SYSTEM FOR SEGMENT INCLUDING SPECIFIC SOUND SIGNAL, METHOD AND PROGRAM FOR THE SAME

TECHNICAL FIELD

The present invention relates to a signal detection in which positions in a stored sound signal similar to a reference sound signal which is a reference signal is detected. The stored sound signal is longer than the reference sound signal. The present invention is a detection system of a segment including a specific sound signal, for example, it is applied to detecting a sound signal referring to apart of a piece of music on a music CD (Compact Disc) which is used as the reference signal.

In other words, in the present invention, a part of a specific piece of music recorded on the music CD is used as the reference signal and a segment in the stored signals including the reference signal is detected, therefore, the segment used as a BGM (Back Ground Music) in the music is searched from a very large database, for example, recordings of TV broadcasts.

Priority is claimed on Japanese Patent Application No. 2004-195995, filed Jul. 1, 2004, the content of which is incorporated herein by reference.

BACKGROUND ART

Figure 6:
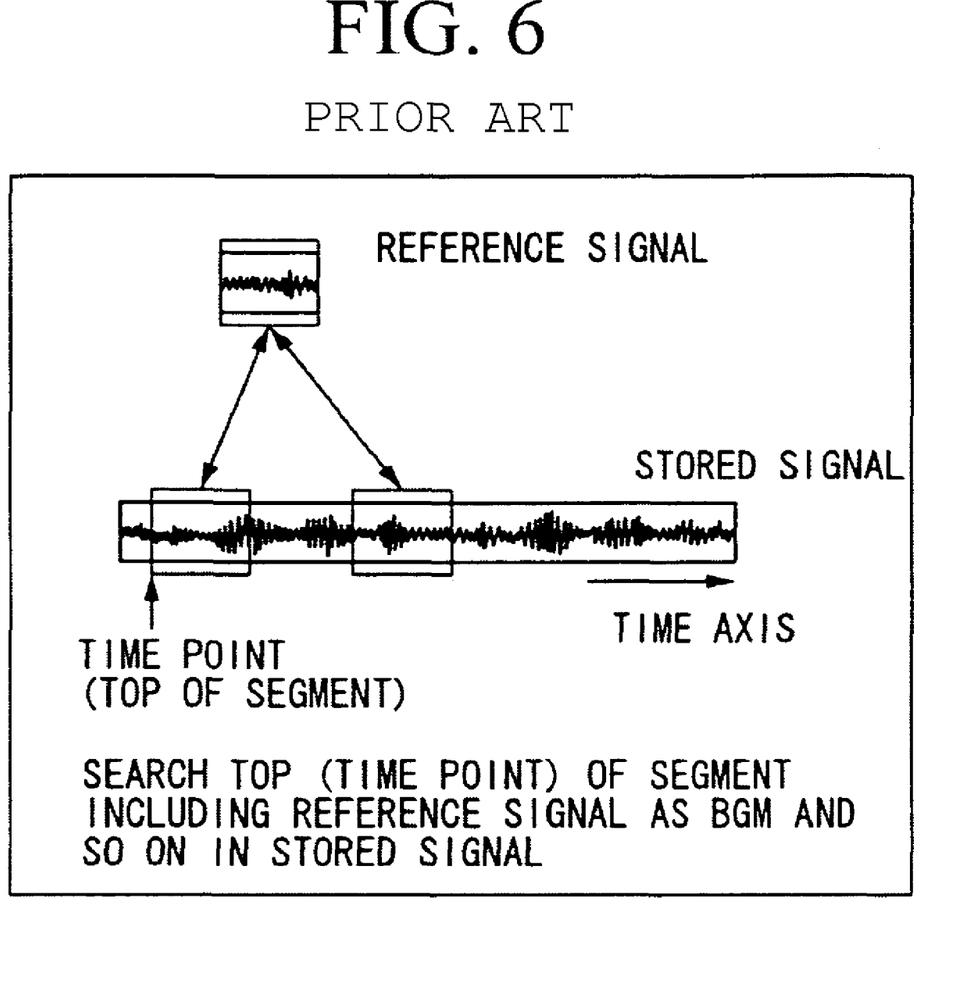
FIG. 6 is a conceptual figure explaining the outline of detection of the segment including the specific sound signal in FIG. 1.

As shown in FIG. 6, the detection of the segment including the specific sound signal is a detection of similar segments including a sound similar to the specific sound signal called the reference signal (reference sound signal) among the sound signals called the stored signals (stored sound signals) that are longer than the reference signal.

It is to be noted that, in the present application, the detection of the similar segment is defined as a detection of a starting time of a top of this similar segment.

In a prior art, as a high-speed method of detecting the similar segment to the reference signal from the stored signals, there is a time-series active search method (for example, Japanese patent No. 3065314, "HIGH SPEED SIGNAL RETRIEVAL METHOD, APPARATUS AND MEDIUM FOR THE SAME")

However, most search methods for the reference signal included in the stored signals, as described above, make an assumption that a similar segment to the reference signal involved in the stored signals is almost the same as the reference signal.

Thus, in a case that another sound such as narration and the like is overlapped on the music for detection from the stored signals (a case of overlapping an additive noise), the sound signal of the segment is greatly different from the reference signal, therefore, it is not possible to perform the search.

Moreover, in the prior art, there are rare examples of a segment detection method including the specific sound signal aimed to detect music used as BGM too. There is only "Self-optimized spectral correlation method for background music identification (Proc. IEEE ICME '02, Lausanne, vol. 1, 333/336 (2002))".

However, "Self-optimized spectral correlation method for background music identification" has a problem such that it requires a very long time for detection because of the huge amount of calculation required.

A divide and locate method is proposed as a method for detecting the segment including the specific sound signal much faster (for example, Japanese Patent Application First Publication No. 2004-102023, "SPECIFIC SOUND SIGNAL DETECTION METHOD, SIGNAL DETECTION APPARATUS AND SIGNAL DETECTION PROGRAM AND MEDIUM").

<Outline of the Divide and Locate Method>

Figure 7:
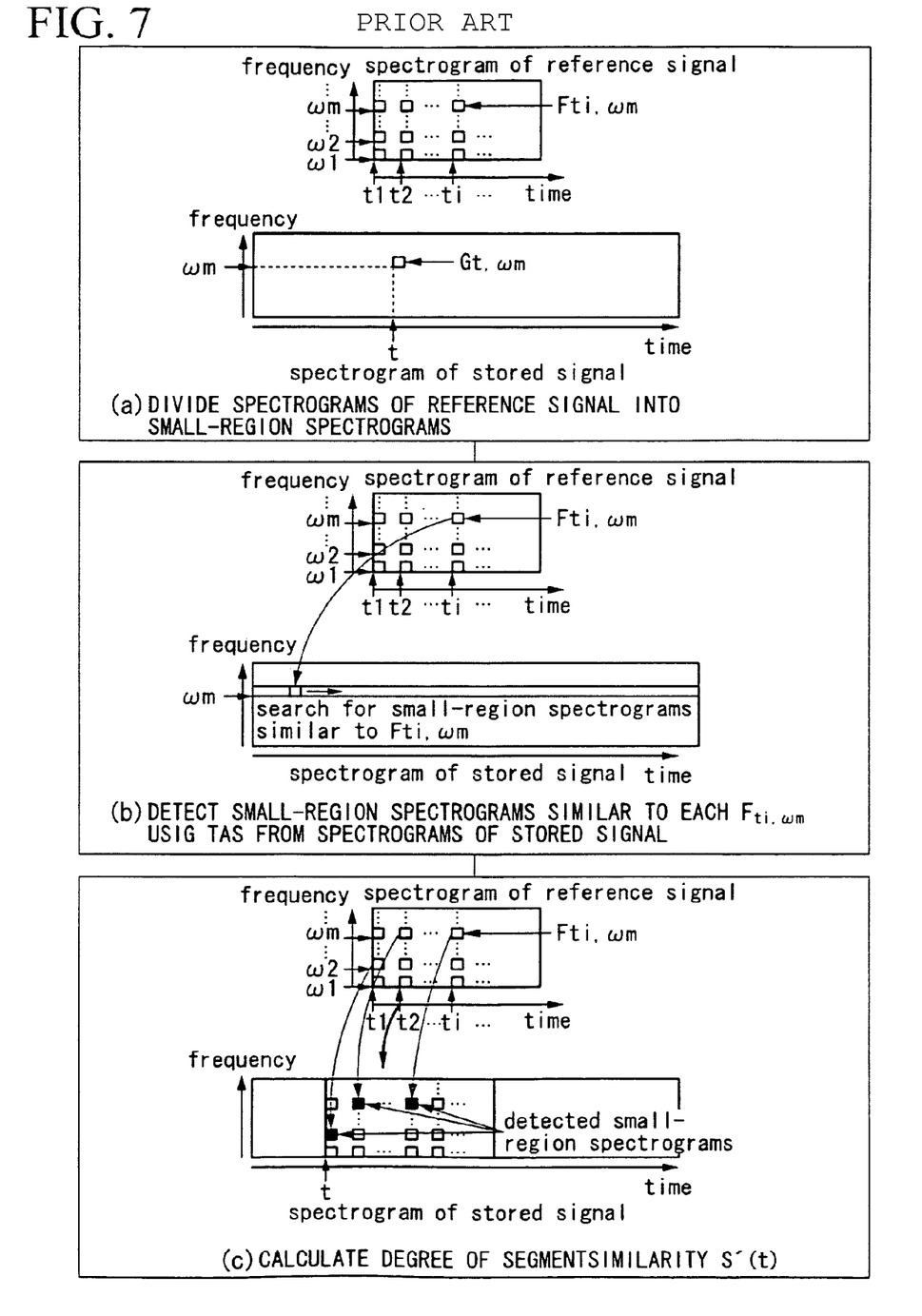
FIG. 7 is a conceptual figure showing the outline of the divide and locate method of the prior example.

FIG. 7 shows the outline of the divide and locate method, and steps of the divide and locate method are explained below.

First, as shown in step (a) of FIG. 7, a power spectral is calculated from waveform signals of the reference signal and the stored signals respectively, and the spectrograms are obtained respectively.

The spectrograms of small areas with a predetermined size are cut out of the spectrogram of the reference signal.

These spectrograms of small areas are generated by cutting a certain number of points of the original spectrogram in a direction of a frequency axis and in a direction of a time axis. These spectrograms of small areas can have overlapping.

The spectrograms of small areas cut in such a manner are called small-region spectrograms.

When a starting time is "ti", and a frequency band is "$\omega m$", the small-region spectrogram in the reference signal is expressed as "$F_{ti, \omega m}$".

If the starting time is "t", the frequency band is "$\omega m$" and the size is the same as "$F_{ti, \omega m}$", then the small-region spectrogram in the stored signal is expressed as "$G_{t, \omega m}$".

A set of all time points ti in the reference signal spectrogram at which the small-region spectrograms $F_{ti, \omega m}$ are divided is expressed as TR (TR={t1, t2, . . . }), and a set of all frequency bands is defined as W (W={$\omega 1, \omega 2, \ldots$ }).

Power values at the small-region spectrograms are normalized respectively in order to reduce the fluctuation of the sound volume.

Next, as shown in step (b) of FIG. 7, in accordance with each of $F_{ti, \omega m}$ in the reference signal, similar time points at the frequency $\omega m$ are searched from the stored signal.

This search is operated by applying the time-series active search method (TAS: Japanese patent No. 3065314, "HIGH SPEED SIGNAL RETRIEVAL METHOD, APPARATUS AND MEDIUM FOR THE SAME").

It should be noted here that the time point which is similar to $F_{ti, \omega m}$ is the time point t at which a degree of small-region similarity $s^{tp}$ ($F_{ti, \omega m}$, $G_{t, \omega m}$) between $F_{ti, \omega m}$ and $G_{t, \omega m}$ is larger than a search threshold for a small-region $s^{tp}_{th}$.

In accordance with the divide and locate method, TAS is applied upon searching the time points at which such similar small-region spectrograms are detected, therefore, a ratio of histogram overlapping between $F_{ti, \omega m}$ and $G_{t, \omega m}$ is used as the degree of small-region similarity $s^{tp}$ ($F_{ti, \omega m}$, $G_{t, \omega m}$).

The degree of small-region similarity in accordance with the ratio of histogram overlapping is called a small-region histogram similarity.

Here, the time-series active search method is explained briefly. The time-series active search method (TAS) is outlined in FIG. 8.

Figure 8:
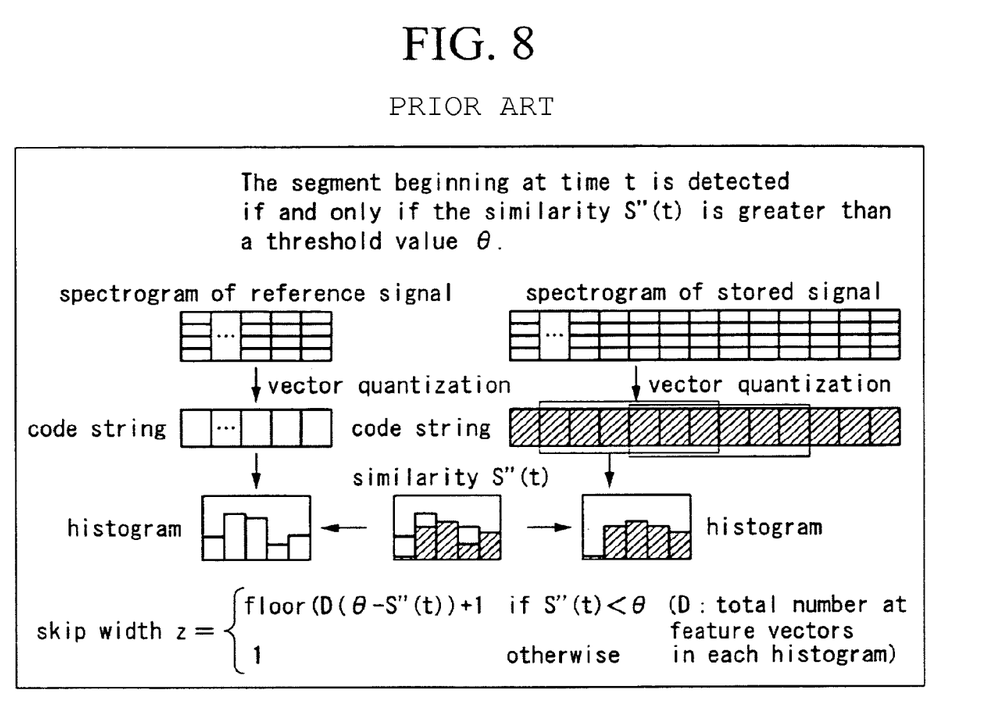
FIG. 8 is a conceptual figure for explaining outline of TAS (time-series active search method).

In accordance with the time-series active search method, a segment with the spectrogram having the ratio of histogram overlapping with respect to the spectrogram of the reference signal is larger than a threshold $\theta$ First, the ratio of histogram overlapping between a spectrogram X and a spectrogram Y is explained.

Here, X and Y are the spectrograms with the same size in the direction of a frequency axis and in the direction of a time axis In the beginning, after normalizing spectral feature at each time point on the spectrograms, code (vector quantization code: a code generated by coding in accordance with vector quantization) strings are generated corresponding to the spectrograms respectively.

Next, in a calculation of the ratio of histogram overlapping, with respect to each histogram, a histogram (histogram feature) is generated by counting up a number of indications of the above-described vector quantization code.

Here, the histogram features of X and Y are expressed as $h^X$ and $h^Y$, and the ratio of histogram overlapping $S_h(h^X, h^Y)$ between X and Y is calculated in accordance with a formula (1) shown below.

$$Sh(h^X, h^Y) = \frac{1}{D} \sum_{\gamma=1}^{L} \min(h\gamma^X, h\gamma^Y) \quad (1)$$

Here, it should be noted that $h\gamma^X$ and $h\gamma^Y$ are frequencies (number of indications of vector quantization codes) of $h^X$ and $h^Y$ in γ-th bins. L is a number of bins in the histogram. D is a total number of frequencies in the histogram.

In the time-series active search method, the above described ratio of histogram overlapping is applied to the similarity of the spectrogram.

The ratio of histogram overlapping between the spectrogram of the reference signal and the spectrogram in the segment t of the stored signal is defined as S'' (t). After comparing at the time t, a skip width z to a next comparison position is calculated in accordance with a formula (2) using S'' (t), a comparison is operated after shifting the comparing position by z, and a new skip width is calculated.

$$z = \begin{cases} \text{floor}(D(\theta - S''(t))) + 1 & \text{if } S''(t) < \theta \\ 1 & \text{otherwise} \end{cases} \quad (2)$$

In the formula (2), floor(x) is an integer which is a maximum and not larger than x.

In the time-series active search method, by repeating the above described operation, the search process is operated.

If the ratio of histogram overlapping of the compared segment is larger than a threshold θ, then the segment is detected to be similar to the reference signal.

In the time-series active search method, in accordance with such an operation, along with reducing a total comparison count, by skipping, it is possible to detect all segments with the ratio of histogram overlapping larger than a threshold θ without missing any.

Next, returning to FIG. 7, as shown in step (c) of FIG. 7, based on the search result of all small-region spectrograms $F_{ti, \omega m}$, with respect to each time point t in the stored signal, the degrees of small-region similarity are integrated and a similarity (a degree of segment similarity) S' (t) to the reference signal at t is calculated by applying a formula (3) below.

$$S'(t) = \frac{1}{|TR|} \sum_{ti \in TR} (\max_{\omega m \in W} (s'^P(Fti, \omega m, Gt + ti, \omega m))) \quad (3)$$

In this formula (3), |TR| is a number of elements in TR. If $G_{t+ti, \omega m}$ is not detected as the small-region spectrogram similar to $F_{ti, \omega m}$ at time t in the stored signals as a result of searching $F_{ti, \omega m}$, in other words, this is the case in a formula (4) shown below, then the degree of similarity (degree of small-region similarity) between the small-region spectrograms is as shown in a formula (5).

$$S^{tp}(Fti, \omega m, Gt+ti, \omega m) \leq S^{tp}th \quad (4)$$

$$S^{tp}(Fti, \omega m, Gt+ti, \omega m) = 0 \quad (5)$$

Accordingly, in a practical search, only when $G_{t+ti, \omega m}$ is detected as the small-region spectrogram similar to $F_{ti, \omega m}$, $S^{tp}$ ($F_{ti, \omega m}$, $G_{t+ti, \omega m}$) is summed up or integrated at the formula (3).

In the formula (3), as in a formula (6) shown below, with respect to $S^{tp}$ ($F_{ti, \omega m}$, $G_{t+ti, \omega m}$), the frequency band ωm is selected from a set of all the frequency bands such that its value is the maximum.

$$\max_{\omega m \in W} (s'^P(Fti, \omega m, Gt + ti, \omega m)) \quad (6)$$

The reason the above described operation is executed is that with respect to the small-region spectrograms of the multiple and different frequency bands at the same time point in the reference signal, if the small-region spectrograms of the multiple and different frequency bands at the same time point in the stored signals are detected as similar small-region spectrograms, the frequency band with the maximum degree of similarity in the small-region histogram is selected, in other words, the frequency band considered to have overlapping sounds which are closest to the silence and overlapping on the reference signal small is selected.

Based on the degree of the segment similarity obtained in accordance with the above manner, the reference signal is detected in the region having the starting time t at which the degree of the segment similarity S' (t) is larger than the threshold $S'_{th}$.

However, upon using the divide and locate method described above, when similar small-region spectrograms are searched at a frequency band ωm, the ratio of the histogram overlapping between $F_{ti, \omega m}$ and $G_{t+ti, \omega m}$ is calculated, therefore, it takes time to calculate the ratio of the histogram overlapping, and moreover, for the histograms of combinations of $F_{ti, \omega m}$ and $G_{t+ti, \omega m}$ which are not similar, their histogram overlapping may be calculated too, therefore, it takes a long time to detect the segment including the specific sound signal.

In the present invention, with respect to searching similar small-region spectrograms that takes a long time in the above described prior art, it is possible to check fast whether or not two small-region spectrograms in the reference signal and the stored signals are similar. The present invention has an object of providing a detection system of the segment including the specific sound signal that detects the segment including the specific sound signal faster than the prior arts by skipping checking the similarity of combinations between the small-region spectrograms having no possibility of being similar.

DISCLOSURE OF INVENTION

A detection system of a segment including a specific sound signal of the present invention detects a segment including sounds similar to a reference signal that is a specific sound signal from stored signals that are sound signals longer than the reference sound signal, including: a reference signal spectrogram division portion which divides a reference signal spectrogram that is a time-frequency spectrogram of the reference signal into spectrograms of small-regions that are small-region reference signal spectrograms; a small-region reference signal spectrogram coding portion which encodes the small-region reference signal spectrogram to a reference signal small-region code; a small-region stored signal spectrogram coding portion which encodes a small-region stored signal spectrogram that is a spectrogram of a small-region in a stored signal spectrogram which is a time-frequency spectrogram of the stored signal to a stored signal small-region code; a similar small-region spectrogram detection portion which detects a small-region spectrogram similar to the small-region reference signal spectrograms respectively based on a degree of similarity of a code from the small-region stored signal spectrogram; and a degree of segment similarity calculation portion which uses a degree of small-region similarity of a small-region stored signal spectrogram similar to the small-region reference signal spectrogram and calculates a degree of similarity between the segment of the stored signal including the small-region stored signal spectrogram and the reference signal, wherein: the detection system of a segment including a specific sound signal detects the segment including a sound in the stored signals similar to the reference signal based on the degree of segment similarity.

The prior art detects the similarity between two small-region spectrograms based on the overlapping ratio of the histogram, however, the present invention detects only the similarity after encoding two small-region spectrograms, therefore, it is possible to reduce the amount of calculation greatly compared to the prior art and it is possible to detect the segment including a specific sound signal at high speed.

In first, second and third aspects of the present invention, the small-region reference signal spectrogram coding portion and the small-region stored signal spectrogram coding portion assign a code (small-region code) to small-region spectrograms, and a similar small-region spectrogram detection portion detects small-region stored signal spectrograms similar to the small-region spectrograms based on similarity of the small-region codes. That is, similarity between two small-region spectrograms is detected based on only similarity of the small-region codes.

In accordance with such an operation, in the detection system of segment including the specific sound signal of the present invention, compared to the prior example in which the ratio of histogram overlapping is calculated, there is no need to operate calculation of the histogram and the like, therefore, the amount of calculation is reduced greatly, it is possible to detect similarity between two small-region spectrograms faster, and it is possible to reduce the time to detect the segment including a specific sound signal.

In a fourth aspect of the present invention, the small-region reference signal spectrogram coding portion and the small-region stored signal spectrogram coding portion generate small-region codes of small-region spectrograms. The small-region spectrogram detection portion, with respect to the small-region spectrograms above, compares with small-region stored signal spectrograms in a list of small-region stored signal spectrograms corresponding to frequency bands in time sequence one by one based on the degree of similarity of the small-region codes, and detects only similar small-region stored signal spectrograms.

In accordance with such an operation, in the detection system of the segment including the specific sound signal of the present invention, compared to the prior example in which the ratio of histogram overlapping is calculated, there is no need to operate calculation of the histogram and the like, therefore, the amount of calculation is reduced greatly, it is possible to detect similarity between two small-region spectrograms faster, and it is possible to reduce the time to detect the segment including a specific sound signal.

In fifth and sixth aspects of the present invention, the small-region reference signal spectrogram coding portion and the small-region stored signal spectrogram coding portion generate small-region codes of small-region spectrograms. The small-region spectrogram detection portion, with respect to the small-region reference signal spectrogram above, prepares an index which is a list of time points when the small-region stored signal spectrogram with the same small-region code in the stored signals appears per each of corresponding frequency bands and per small region codes in the small-region stored signal spectrograms. A table is generated beforehand by calculating similarities of all combinations of the small-region codes, and by referring to this table, the small-region code similar to the small-region code of the small-region reference spectrogram is picked up, and by referring to the index above, the small-region stored signal spectrogram similar to the small-region reference signal spectrogram is detected.

In accordance with such an operation, in the detection system of a segment including the specific sound signal of the present invention, compared to calculating the ratio of histogram overlapping, it is possible to detect similarity between two small-region spectrograms faster, and it is possible to omit the detection operation of similarity between the small-region spectrograms with no possibility of similarity by skipping checking the similarity of combinations between the small-region spectrograms having no similarity. Therefore, it is possible to detect segments including the specific sound signal faster.

BEST MODE FOR CARRYING OUT THE INVENTION

Hereafter, referring to the figures, preferable embodiments of the present invention are explained. However, the scope of the present invention is not considered to be limited by the embodiments below, and for example, appropriate combinations of components of the embodiments can be made.

Figure 1:
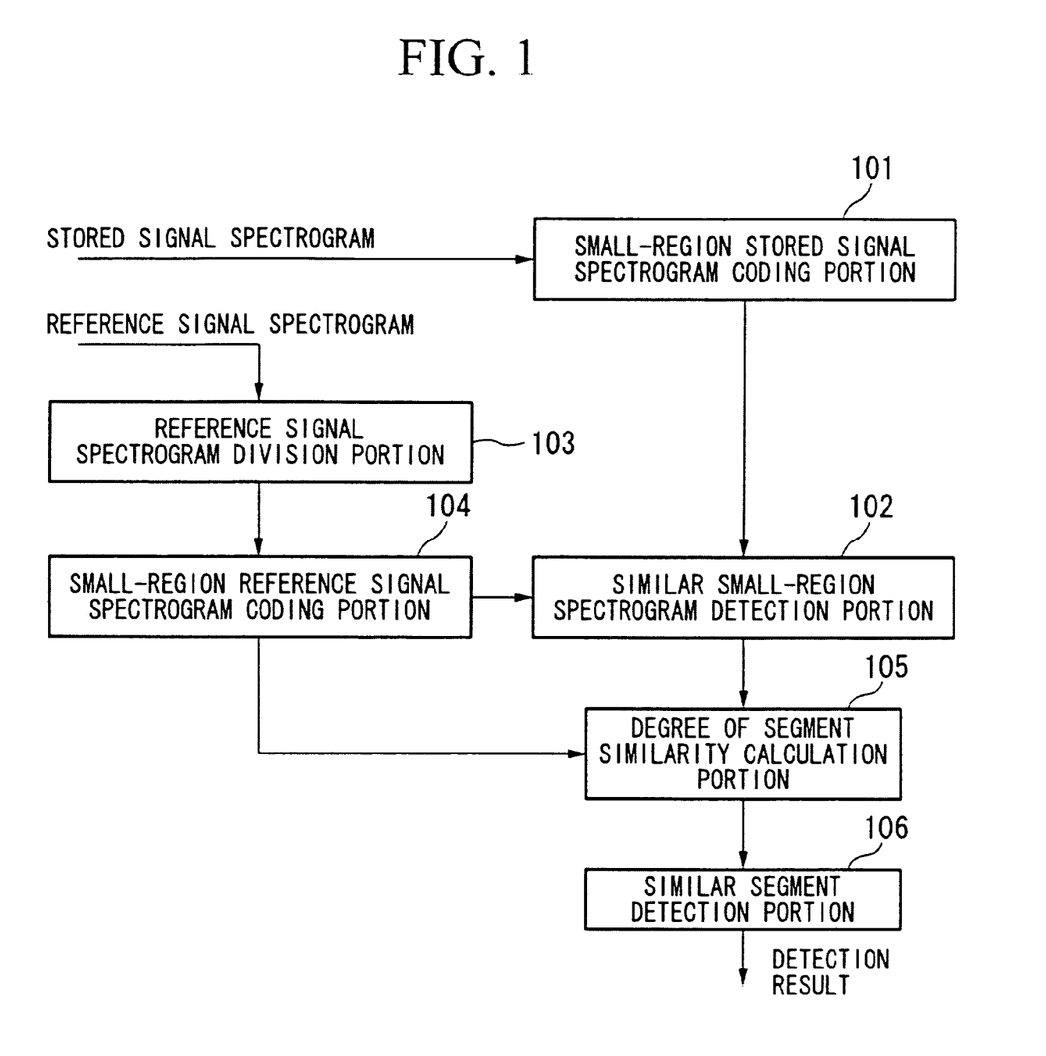
FIG. 1 is a block diagram showing one structural example of the detection system of the segment including a specific sound signal in one embodiment of the present invention.

FIG. 1 is a block diagram showing the detection system of a segment including a specific sound signal of one embodiment in accordance with the present invention.

The detection system of the segment including the specific sound signal shown in FIG. 1 is a system that detects a segment including sounds similar to the specified sound signal called the reference signal from the sound signals called stored signals longer than the reference signal. Practically, it is realized on a general computer provided with a CPU (Central Processing Unit) and memory.

In this diagram, a small-region stored signal spectrogram coding portion 101 encodes the small-region stored spectrogram which is a spectrogram of a small-region in the stored signal spectrogram that is the time-frequency spectrogram of the stored signal above, and outputs the stored signal small-region code.

Figure 4:
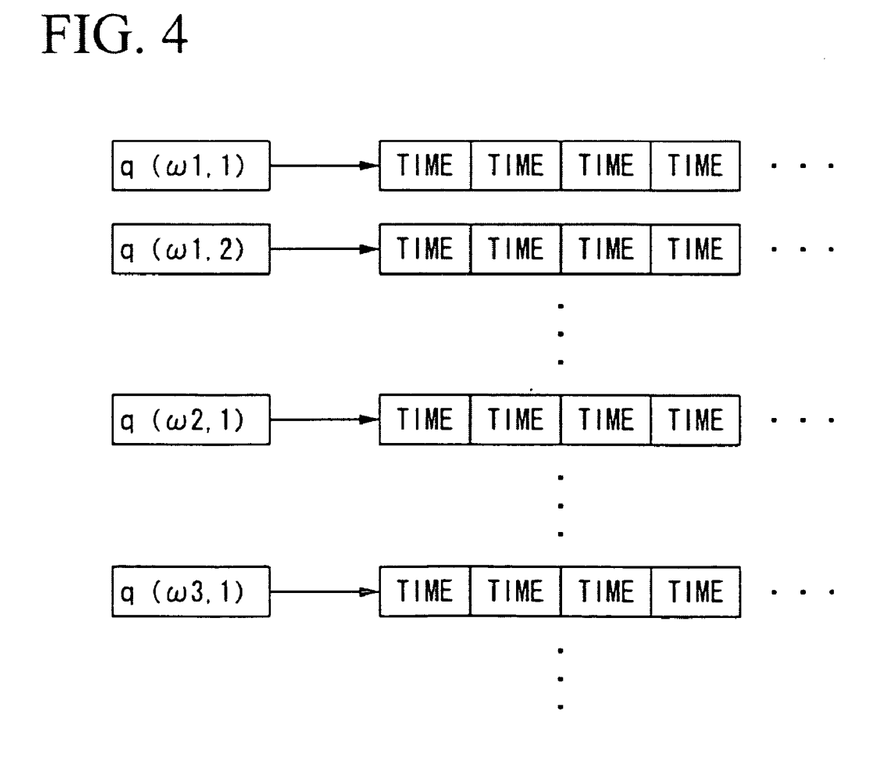
FIG. 4 is a conceptual figure showing the index listing the time points when the small-region stored signal spectrogram appears per the small-region code.

A small-region spectrogram detection portion 102 includes a function of indexing time points when the small-region stored signal spectrogram appears, and a function of detecting the small-region stored signal spectrogram similar to the small-region reference signal spectrogram by referring to the index. That is, the prior is a process of extracting time points for operating the segment detection by detecting the similarity of the small-region spectrogram instead of detailed detection of segments in accordance with the stored signal small-region code input from the small-region stored signal spectrogram coding portion 101, and the index is generated such as shown in FIG. 4 concretely.

The latter extracts the small-region codes similar to the reference signal small-region code using a table of degree of similarity among small-region codes (FIG. 3) generated beforehand, detects the small-region stored signal spectrogram with the small-region code by index search and outputs its time points and degree of small-region similarity.

A reference signal spectrogram division portion 103 divides the reference signal spectrogram which is a time-frequency spectrogram of the reference signal above (signal to be detected) into small-region spectrograms called small-region reference signal spectrograms.

A small-region reference signal spectrogram encoding portion 104 encodes the small-region reference signal spectrograms and outputs reference signal small-region codes.

A degree of segment similarity calculation portion 105, using the similarity (degree of small-region similarity) between small-region stored signal spectrograms detected by the small-region spectrogram detection portion 102 and the similar small-region reference signal spectrograms, calculates a degree of similarity (degree of segment similarity) between a segment signal of the stored signals including the similar small-region stored signal spectrograms and the reference signal.

A similar segment detection portion 106, in accordance with the segment similarity above, detects the segment in the stored signals including sounds similar to the reference signal.

Figure 2:
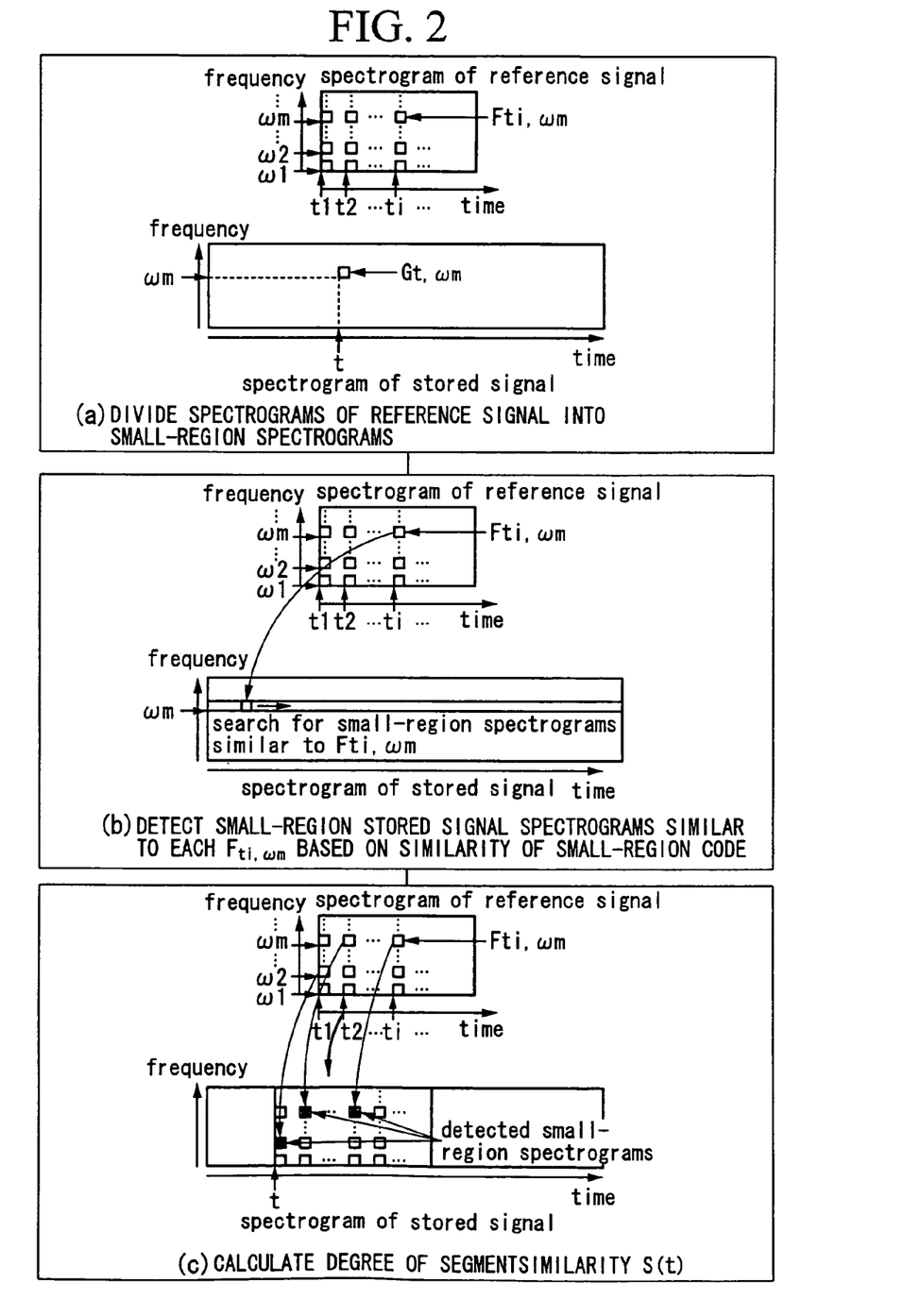
FIG. 2 is a conceptual figure explaining operation of the detection system of the segment including the specific sound signal in FIG. 1.

Referring to FIG. 1 and 2, an operation of the detection system of the segment including the specific sound signal of one embodiment in accordance with the present invention is explained. FIG. 2 is a conceptual figure explaining operation steps of the detection system of the segment including a specific sound signal of the present invention.

A stored signal spectrogram extraction portion and a reference signal spectrogram extraction portion respectively read sound wave-form signals of stored signals and reference signals, extract power spectrums, and output the stored signal spectrograms and the reference signal spectrograms.

The reference signal spectrogram division portion 103, as shown in step (a) of FIG. 2, divides small-region spectrograms in a fixed size (a fixed time width) at regular intervals, and outputs them as the small-region reference signal spectrograms.

Upon dividing the small-region reference signal spectrograms, small-region reference signal spectrograms can be overlapped.

The reference signal spectrogram division portion 103 takes the small-region reference signal spectrograms by dividing points of a fixed number on the spectrogram from the original spectrogram in a direction of a frequency axis and in a direction of a time axis.

The above described spectrogram of a small-region is called a small-region spectrogram.

Hereinafter, the small-region reference signal spectrogram with a starting time ti and a frequency band $\omega m$ is expressed as $F_{ti, \omega m}$.

Similarly, the small-region stored signal spectrogram with a starting time ti and a frequency band $\omega m$ the same size as $F_{ti, \omega m}$ above is expressed as $G_{ti, \omega m}$.

A set of all time points ti in the reference signal spectrogram at which the small-region spectrograms $F_{ti, \omega m}$ are divided is expressed as TR (TR={t1, t2, ... }), and a set of all frequency bands is defined as W (W={$\omega 1$, $\omega 2$, ... }). Numbers of elements in W and TR can be 1.

The power spectrum of each small-region spectrogram (both small-region stored signal spectrogram and small-region reference signal spectrogram) is normalized per small-region spectrogram in order to reduce the fluctuation of the sound volume.

That is, the power spectrum at each time point of the small-region is normalized by an average value of the power spectrum at the time in the small-region frequency band.

The small-region reference signal spectrogram coding portion 104, the same as the divide and locate method explained in the prior art, extracts the histogram features (as explained in the prior art above, after normalizing the spectrum feature at each time point on the spectrogram, encoding in accordance with the vector quantization, calculating the histogram feature by counting the number of appearances of each code corresponding to the code and setting it to the bin).

This histogram feature is a feature vector including a component of a value of each bin (number of appearances of each vector quantized code in the small-region spectrogram) of the histogram.

The small-region reference signal spectrogram coding portion 104, by encoding this histogram feature at each frequency band in accordance with the vector quantization, encodes each small-region reference signal spectrogram.

It should be noted that, in the present invention, the vector quantization is a procedure of assigning one code to a specified vector.

The small-region stored signal spectrogram coding portion 101, the same as encoding of the small-region reference signal spectrogram by the small-region reference signal spectrogram coding portion 104, encodes the small-region stored signal spectrograms per band.

Upon encoding the small-region signal spectrograms at each small-region, the small-region stored signal spectrogram coding portion 101 and the small-region reference signal spectrogram coding portion 104 use the same code book.

The code calculated here by encoding the histogram feature of the small-region spectrogram is called a small-region code (reference signal small-region code, stored signal small-region code; these are the vector quantized codes calculated by vector quantization of histograms per band), the reference signal small-region code of the small-region reference signal spectrogram $F_{ti, \omega m}$ is expressed as $c(F_{ti, \omega m})$, and the stored signal small-region code of the small-region stored signal spectrogram $G_{ti, \omega m}$ is expressed as $c(G_{ti, \omega m})$.

It is possible to achieve such encoding of the small-region spectrograms by defining the power spectrum values of the small-region reference signal spectrograms and the small-region stored signal spectrograms at each time point as the feature vectors without using the histogram, encoding these feature vectors in accordance with the vector quantization, and defining them as the reference signal small-region code and the stored signal small-region code respectively (corresponding to the structure of the second aspect of the present invention).

The similar small-region spectrogram detection portion 102 detects similar small-region stored signal spectrograms to each small-region reference signal spectrogram $F_{ti, \omega m}$ from the stored signal spectrograms as shown in a step (b) of FIG. 2, based on the degree of similarity between the reference signal small-region code and the stored signal small-region code which is used as the degree of similarity between the small region reference signal spectrogram and the small-region stored signal spectrum.

Figure 3:
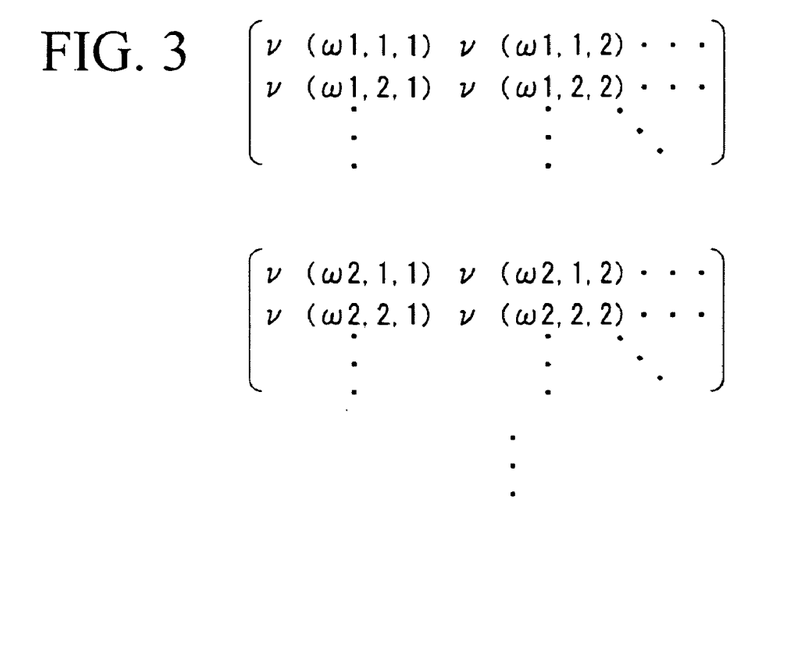
FIG. 3 is a conceptual figure showing a structure of a table of degree of similarity among small-region codes.

The similar small-region spectrogram detection portion 102, as shown in FIG. 3, has definition of the degree of similarity (degree of similarity among small-region codes) per small-region code on a table (the similar small-region spectrogram detection portion 102 stores in a memory portion inside). By referring to this table (called a table of degree of similarity among small-region codes), it is possible to find the degree of similarity between the reference signal small-region code and the stored signal small-region code.

FIG. 3 shows a structure of the table of degree of similarity among small-region codes above. In this table, $v$ ($\omega m$, j, k) shows the degree of similarity among small-region codes between a small-region code q($\omega m$, j) and a small-region code q($\omega m$, k) at the band $\omega m$.

It should be noted that the small-region codes at the band $\omega m$ are shown as q($\omega m$, 1), q($\omega m$, 2), . . . .

The similar small-region spectrogram detection portion 102 calculates a distance between representative vectors of the small-region codes q($\omega m$, j) and q($\omega m$, k), and defines $v$ ($\omega m$, j, k) a larger value if the calculated distance is small and a smaller value if the calculated distance is large. The distance between the representative vectors can be calculated in a method using Euclid distance.

In this embodiment, $v$ ($\omega m$, j, k) is defined as a real number from 0 to 1. That is, at each band $\omega m$, calculation is operated such as $v$ ($\omega m$, j, k) is 0 if the distance is the maximum, and $v$ ($\omega m$, j, k) is 1 if the distance is the minimum.

The degree of small-region similarity between $F_{ti, \omega m}$ and $G_{t, \omega m}$ which is $s^P(F_{ti, \omega m}, G_{t, \omega m})$ is defined as $v$ ($\omega m$, $c(F_{ti, \omega m})$, $c(G_{t, \omega m})$).

The small-region stored signal spectrogram similar to $F_{ti, \omega m}$ is such as the small-region stored signal spectrogram $G_{t, \omega m}$ that the degree of small-region similarity between $F_{ti, \omega m}$ and $G_{t, \omega m}$ which is $s^P(F_{ti, \omega m}, G_{t, \omega m})$ is larger than the predetermined search threshold for small-region $s^P_{th}$.

Here, for example, the search threshold $s^P_{th}$ is determined experimentally so that no segment similar to the reference signal is missing or few segments similar to the reference signal is missing.

This $s^P_{th}$ can be set to the same value to all the bands in W, or can be set to different values in different bands. In this embodiment, the same value is set.

In other words, the similar small-region spectrogram detection portion 102, as shown in FIG. 4, by using indices, in which the small-region stored signal spectrograms are grouped, per small-region code of the stored signal spectrograms, and by referring to the table of degree of similarity among small-region codes shown in FIG. 3, detects the stored signal small-region code similar to the reference signal small-region code $c(F_{ti, \omega m})$, that is, detects the small-region stored signal spectrogram having the small-region code with a larger degree of similarity among small-region codes with respect to $c(F_{ti, \omega m})$ than the search threshold for small-region $s^P_{th}$.

This is operated by referring to a list of appearance positions (time points) of the small-region stored signal spectrograms from the indices of FIG. 4 having all small-region codes which have, with respect to all $F_{ti, \omega m}$, the degree of similarity among small-region codes to the $c(F_{ti, \omega m})$ larger than the search threshold for small-region $s^P_{th}$.

In the indices of FIG. 4, in the list (array of time points: horizontal raw) pointed by q($\omega m$, j), time points of all small-region stored signal spectrograms having q($\omega m$, j) as the stored signal small-region code and being arranged in an array in time-series are stored.

It is possible that this similar small-region spectrogram detection portion 102, with respect to all small-region reference signal spectrograms above, compares the similar small-region reference signal spectrograms to the small-region stored signal spectrograms in a list of the small-region stored signal spectrograms similar to the small-region reference signal spectrograms in a corresponding band arranged in time-series one by one and based on the degree of small-region code similarity, and detects only similar small-region stored signal spectrograms to small-region reference signal spectrograms (structure of the fourth aspect of the present invention).

In other words, it is possible that the similar small-region spectrogram detection portion 102, with respect to the small-region reference signal spectrogram, compares sequentially based on the degree of small-region similarity to the small-region stored signal spectrograms of a list in which the small-region stored signal spectrograms corresponding to a frequency band of the small-region reference signal spectrogram are ordered in time-series, and detects only similar small-region stored signal spectrograms.

The degree of segment similarity calculation portion 105, based on a positional relationship between time points of appearance of the small-region reference signal spectrograms in the reference signal and time points of appearance of the small-region stored signal spectrograms which are similar to the small-region reference signal spectrograms in the stored signal, calculates time points t at which the segments including these small-region stored signal spectrograms and calculates the degree of similarities between these segments and reference signal (degrees of segment similarity). As described in FIG. 2(c), the degree of segment similarity calculation portion 105 integrates all degrees of small-region similarity above, and calculates the degree of similarity (degree of segment similarity) S(t) at t in stored signal to the reference signal in accordance with a formula (7) below.

$$S(t) = \frac{1}{|TR||W|} \sum_{\omega m \in W} \sum_{ti \in TR} (s^P(Fti, \omega m, Gt+ti, \omega m)) \quad (7)$$

|TR| is a number of the elements in the set TR of time points, and |W| is a number of elements in a set W of the frequency bands.

Upon calculating the degree of segment similarity, if no $G_{t+ti, \omega m}$ is detected in the stored signal as the small-region spectrogram similar to $F_{ti, \omega m}$ at the time point t, in other words, if the degree of small-region similarity $s^P(F_{ti, \omega m}, G_{t+ti, \omega m})$ is lower than or equal to the search threshold for small-region $s^P{}_{th}$ as shown in a formula (8), then a formula (9) is applied for the degree of small region similarity $s^P(F_{ti,\omega m}, G_{t+ti,\omega m})$.

$$S^P(Fti,\omega m, Gt+ti,\omega m) \leq S^P th \quad (8)$$

$$S^P(Fti,\omega m, Gt+ti,\omega m) = 0 \quad (9)$$

Upon actual searching, if $G_{t+ti,\omega m}$ is detected as the small-region spectrogram similar to $F_{ti,\omega m}$ upon the index search applying FIG. 3 and FIG. 4, in other words, if the degree of small-region similarity $s^P(F_{ti,\omega m}, G_{t+ti,\omega m})$ is larger than the predetermined search threshold for small-region $s^P{}_{th}$, then as shown in the formula (7), the degree of segment similarity calculation portion 105 adds $s^P(F_{ti,\omega m}, G_{t+ti,\omega m})$ to the degree of small-region similarity S(t). When, with respect to all the small-region reference signal spectrogram, the summation of the degree of small-region similarity to the similar small-region stored signal spectrograms is finished, at each time point t, the normalization is operated by dividing the summation result by t by |TR| and |W|, and calculates the degree of segment similarity S(t) at t.

The similar segment detection portion 106, based on the degree of segment similarity S(t) calculated as described above, detects the segments similar to the reference signal spectrogram, having the segment similarity S(t) larger than the search threshold $S_{th}$ in the stored signal spectrograms and starting at the time point t.

In this case, at the similar segment detection portion 106, a value obtained from experiments or experiences can be set as the search threshold $S_{th}$. There is a different option such that, by calculating a distribution of multiple degrees of segment similarity, and calculating a deviation, the search threshold $S_{th}$ is determined as $S_{max}-3\sigma$, where $S_{max}$ is the maximum value of the degree of similarity S(t) and the similar segments can be selected.

Of course, this −3 is changeable to another value experimentally measured too.

Figure 5:
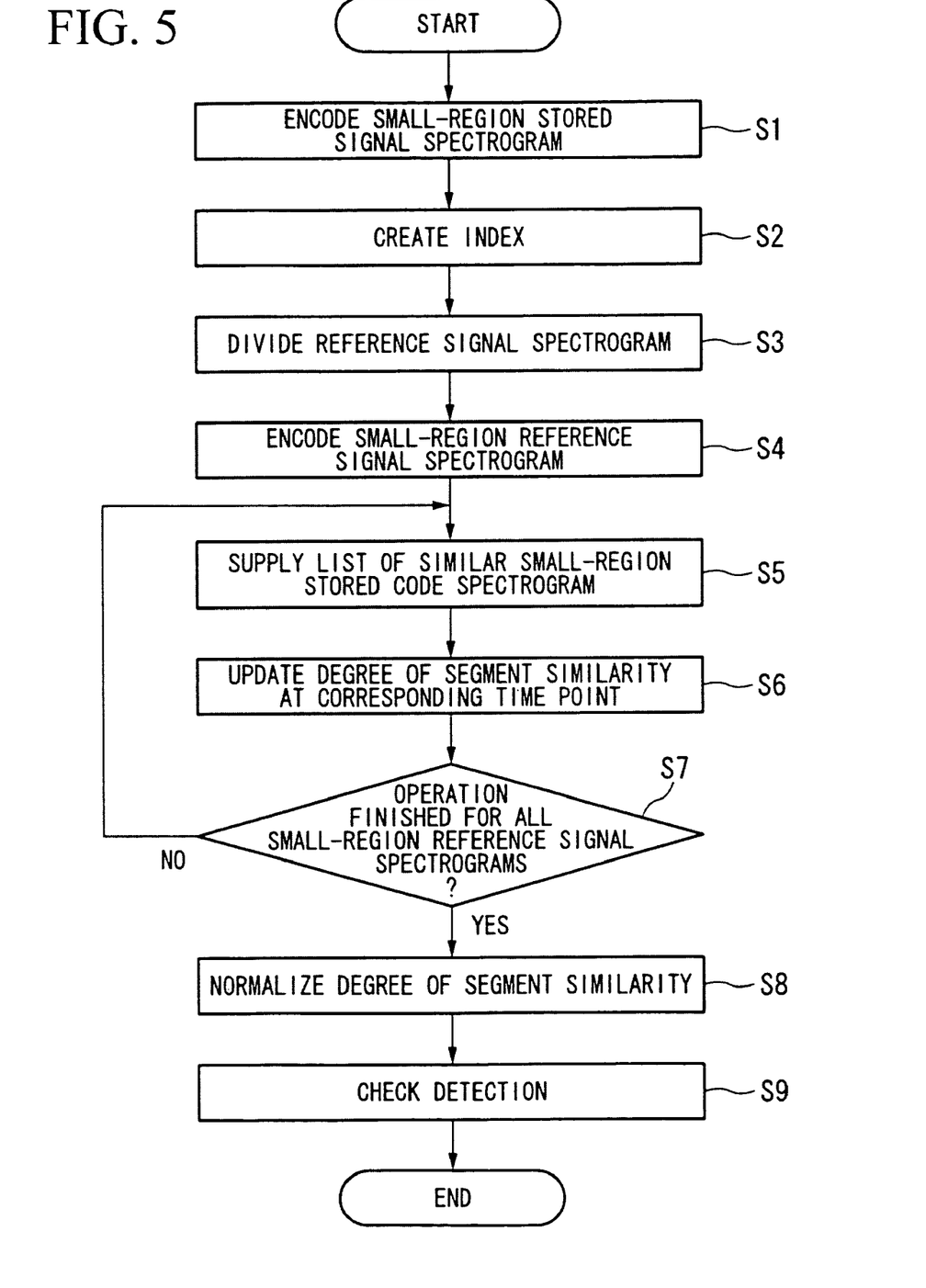
FIG. 5 is a flowchart showing an operation example of the detection system of the segment including the specific sound signal in one embodiment in FIG. 1.

Referring to FIG. 1 and FIG. 5, operations of the detection system of segment including specified sound signal of the present invention are explained. FIG. 5 is a flowchart showing an operation example of the detection system of the segment including specific sound signal in FIG. 1.

The small-region stored signal spectrogram coding portion 101 reads stored signal spectrograms from a stored signal spectrogram extraction portion which is not shown in the figures.

The small-region stored signal spectrogram coding portion 101 encodes the small-region stored signal spectrograms in the stored signal spectrograms one by one.

The stored signal small-region codes calculated in accordance with the operations above are supplied by the small-region stored signal spectrogram coding portion 101 to the similar small-region spectrogram detection portion 102 (step S1).

The similar small-region spectrogram detection portion 102 distinguishes the supplied stored signal small-region codes above into groups, and generates indices shown in FIG. 4 (step S2).

The reference signal spectrogram division portion 103 reads the reference signal spectrograms from, for example, files (files to which the reference signal spectrograms generated by a reference signal spectrogram extraction portion not shown in the figures are stored).

The reference signal spectrogram division portion 103 divides this into the small-region reference signal spectrograms, and supplies the divided small-region reference signal spectrograms to the small-region reference signal spectrogram coding portion 104 one by one (step S3).

The small-region reference signal spectrogram coding portion 104 encodes the small-region reference signal spectrograms one by one, and supplies the generated reference signal small-region code $c(F_{ti,\omega m})$ and the time point ti on the reference signal to the similar small-region spectrogram detection portion 102 (step S4).

The similar small-region spectrogram detection portion 102 refers to the table of degree of similarity among small-region codes, compares between corresponding degree of similarity among small-region codes (degree of small-region similarity) and the search threshold for small-region, and picks up the small-region codes larger than the search threshold for the small-region. A time point t+ti at which the small-region code appears in the stored signals is searched using the indices of FIG. 4.

Moreover, based on the appearance point t+ti of the small-region stored signal spectrogram having the similar small-region code, a starting time point t of the segment of the stored signal similar to the reference signal is calculated, and the degree of similarity among small-region codes (i.e. degree of small-region similarity) together with t correspondently is supplied to the degree of segment similarity calculation portion 105 (step S5).

The degree of segment similarity calculation portion 105 adds the degree of small-region similarity $s^P$ between the small-region reference signal spectrogram $(F_{ti,\omega m})$ and the small-region stored signal spectrogram $(G_{t+ti,\omega m})$ to the degree of segment similarity at time point t (step S6).

The degree of segment similarity calculation portion 105 checks whether or not the reference signal small-region codes of all small-region reference signal spectrograms are supplied from the small-region reference signal spectrogram coding portion 104 and operations of step S5 and S6 are finished (step S7).

If the degree of segment similarity calculation portion 105 detects that all small-region reference signal spectrograms are finished, then the operation proceeds to step S8, and if not finished yet, then the operation proceeds to step S5.

The degree of segment similarity calculation portion 105, using a formula (7), divides the added degree of segment similarity at each time point by a number of the supplied small-region reference signal spectrograms and normalizes it (step S8).

The similar segment detection portion 106, if the normalized degree of segment similarity of the segment starting from the time point t is larger than the search threshold $S_{th}$, outputs this time point t and finishes the operation (step S9).

It can be appropriate that the similar segment detection portion 106 outputs only the segment having the maximum degree of segment similarity which is larger than the search threshold without outputting multiple segments larger than the search threshold.

Next, an example of an experiment applying the above embodiment is explained.

The above embodiment and the divide and locate method of the prior art are implemented on a personal computer with specs below, operation speed is measured, and the embodiment of the present invention and the prior art are compared.

Intel (registered trade mark) Xeon (registered trademark) is used for a CPU, RED HAT (registered trademark) Linux (registered trademark) 9 is used for OS, and GNU gcc is used for a compiler.

It should be noted that an executable file is compiled with a compiler optimization option "−03".

In this experiment, a number of frequency bands |W| is 4, the spectrograms are output every 2 milliseconds by 28 band-pass filters installed with fixed intervals on a logarithmic axis in a band between 525-2000 Hz, and the spectrograms are divided into 4 frequency bands on a frequency axis.

In this case, as the small-region reference signal spectrograms, on each frequency band above, the spectrograms with 100 milliseconds length every 0.6 seconds are extracted.

In the experiment, from the sound signal (stored signal) of 30 minutes, 100 pieces of music in 15 seconds (reference signal) are extracted, and the average time required for detecting each reference signal is measured.

As a result of the experiment, an average detection time is approximately 0.58 seconds in the prior method and less than 0.01 seconds in the embodiment of the present invention, therefore, it is possible to detect at approximately 70 times the speed as the prior art in accordance with a simple calculation.

In this case, the stored signal is a mixture of both the music signal and the sound signal of speech mixed in a power ratio (electric power of the music signal/electric power of the sound signal of speech) of approximately 5 db. The search accuracy in this case is 99.9% in the prior method (Japanese Patent Application First Publication No. 2004-102023, "SPECIFIC SOUND SIGNAL DETECTION METHOD, SIGNAL DETECTION APPARATUS AND SIGNAL DETECTION PROGRAM AND MEDIUM") and 99.0% in the embodiment of the present invention.

It can be appropriate that a program for implementing the functions of the detection system of the segment including specific sound signal in FIG. 1 is recorded in a computer readable storage medium, the computer system reads the program recorded in the storage medium and operates the detection of the segment including specific sound signal by executing it. "Computer system" here includes the OS and the hardware such as peripheral equipment. "Computer system" includes WWW system having a homepage provision environment (or display environment). "Computer readable storage medium" is a portable medium such as a flexible disc, a magneto-optical disc, a ROM, a CD-ROM and the like, or a storage apparatus such as a hard disc installed in the computer system. Moreover, "computer readable medium" includes such as a volatile memory inside the computer systems used for a server or a client to which the programs are transmitted via a network like the Internet or a communication line like a telephone line, which saves the programs for a certain time period.

The program above can be transmitted from the computer storing this program in the storage apparatus or the like via a transmission medium or via transmission waves in the transmission medium to another computer system. "Transmission medium" transmitting the program is a medium such as a network (communication network) like the Internet or a communication line (line) like a telephone line that has a function to transmit information. It can be appropriate that the above program can be a program for realizing a part of the above described functions. Moreover, it can be appropriate that the program is a so-called a difference file (difference program) which realizes the above functions by being combined with a program already stored in the computer.

INDUSTRIAL APPLICABILITY

In the prior art, the similarity between two small-region spectrograms is checked based on the overlapping ratio of the histograms, however, in the present invention, because two small-region spectrograms are encoded and only similarity is detected by indexing, it is possible to reduce calculation greatly compared to the prior art and it is possible to detect the segment including the specific sound signal at high speed.

The invention claimed is:

1. A detection system of a segment including a specific sound signal comprising:
    a reference signal spectrogram division portion which divides a reference signal spectrogram that is a time-frequency spectrogram of the reference signal into spectrograms of small-regions that are small-region reference signal spectrograms;
    a small-region reference signal spectrogram coding portion which encodes the small-region reference signal spectrogram to a reference signal small-region code;
    a small-region stored signal spectrogram coding portion which encodes a small-region stored signal spectrogram that is a spectrogram of a small-region in a stored signal spectrogram which is a time-frequency spectrogram of the stored signal, and obtain a stored signal small-region code;
    a similar small-region spectrogram detection portion which detects a small-region stored signal spectrogram similar to the small-region reference signal spectrograms respectively based on a degree of similarity of a code from the small-region stored signal spectrogram; and
    a degree of segment similarity calculation portion, by using a degree of small-region similarity between the small-region reference signal spectrogram and the small-region stored signal spectrogram which is similar to the small-region reference signal spectrogram and which is detected by the similar small-region spectrogram detection portion and calculates a degree of similarity between the segment of the stored signal including the small-region stored signal spectrogram which is similar to the small-region reference signal spectrogram and the reference signal.

2. The detection system of a segment including a specific sound signal according to claim 1, wherein:
    the small-region reference spectrogram coding portion and the small-region stored signal spectrogram coding portion use power spectrum values of each point on the small-region spectrogram as a feature vector, and calculate the reference signal small-region code and the stored signal small-region code respectively by quantizing the feature vector.

3. The detection system of a segment including a specific sound signal according to claim 1, wherein:
    the small-region reference spectrogram coding portion and the small-region stored signal spectrogram coding portion respectively generate the reference signal small-region code and the stored signal small-region code by encoding a spectrum feature at each time point in the small-region spectrogram to a code, generating a histogram by counting up appearance of the code in the small-region spectrogram, generating a histogram feature that is a feature vector constructed from bin counts in the histogram, and encoding the histogram feature by vector quantization.

4. The detection system of a segment including a specific sound signal according to one of claims 1, wherein:
    the similar small-region spectrogram detection portion, with respect to the small-region reference signal spectrogram, compares sequentially based on the degree of small-region similarity to the small-region stored signal spectrograms of a list in which the small-region stored signal spectrograms corresponding to a frequency band of the small-region reference signal spectrogram are ordered in time-series, and detects only similar small-region stored signal spectrograms.

5. The detection system of a segment including a specific sound signal according to one of claims 1, further comprising;
a table of degree of similarity among small-region codes generation function which, with respect to the small-region codes calculated by encoding the small-region spectrogram, generates a table of degree of similarity among small-region codes by calculating degree of similarity among all small-region codes, wherein:
the similar small-region spectrogram detection portion detects similarity between the small-region reference signal spectrogram and the small-region stored signal spectrogram by referring to the table of degree of similarity among small-region codes.

6. The detection system of a segment including a specific sound signal according to one of claim 5, further comprising;
an index generation function which generates an index in which appearance time points in the stored signal are grouped by using the small-region codes, wherein:
the similar small-region spectrogram detection portion refers to the index using the small-region code similar to the reference signal small-region code selected by referring to the table of degree of similarity among small-region codes, and detects the small-region stored spectrogram having the small-region code as the small-region stored signal spectrogram similar to the small-region reference signal spectrogram.

7. A detection method of a segment including a specific sound signal comprising the steps of:
a reference signal spectrogram division step which divides a reference signal spectrogram that is a time-frequency spectrogram of the reference signal into spectrograms of small-regions that are small-region reference signal spectrograms;
a small-region reference signal spectrogram coding step in which the small-region reference signal spectrogram is encoded to a reference signal small-region code;
a small-region stored signal spectrogram coding step in which a small-region stored signal spectrogram that is a spectrogram of a small-region in a stored signal spectrogram which is a time-frequency spectrogram of the stored signal, is encoded and a stored signal small-region code is obtained;
a similar small-region spectrogram detection step in which a small-region stored signal spectrogram similar to the small-region reference signal spectrograms is detected respectively from the small-region stored signal spectrogram based on a degree of similarity of a code; and
a degree of segment similarity calculation step, by using a degree of small-region similarity between the small-region reference signal spectrogram and the small-region stored signal spectrogram which is similar to the small-region reference signal spectrogram and which is detected by the similar small-region spectrogram detection step and calculates a degree of similarity between the segment of the stored signal including the small-region stored signal spectrogram which is similar to the small-region reference signal spectrogram and the reference signal.

8. The detection method of a segment including a specific sound signal according to claim 7, wherein:
in the small-region reference spectrogram coding step and the small-region stored signal spectrogram coding step, power spectrum values of each point on the small-region spectrogram as a feature vector are used, and the reference signal small-region code and the stored signal small-region code are calculated respectively by quantizing the feature vector.

9. The detection method of a segment including a specific sound signal according to claim 7, wherein:
in the small-region reference spectrogram coding step and the small-region stored signal spectrogram coding step, the reference signal small-region code and the stored signal small-region code are respectively generated by encoding a spectrum feature at each time point in the small-region spectrogram to a code, generating a histogram by counting up appearance of the code in the small-region spectrogram, generating a histogram feature that is a feature vector constructed from bin counts in the histogram, and encoding the histogram feature by vector quantization.

10. The detection method of a segment including a specific sound signal according to one of claims 7, wherein:
the similar small-region spectrogram detection step, with respect to the small-region reference signal spectrogram, compares sequentially based on the degree of small-region similarity to the small-region stored signal spectrograms of a list in which the small-region stored signal spectrograms corresponding to a frequency band of the small-region reference signal spectrogram are ordered in time-series, and only similar small-region stored signal spectrograms are detected.

11. The detection method of a segment including a specific sound signal according to one of claims 7, further comprising;
a step which, with respect to the small-region codes calculated by encoding the small-region spectrogram, generates a table of degree of similarity among small-region codes by calculating degree of similarity among all small-region codes, wherein:
the similar small-region spectrogram detection step detects similarity between the small-region reference signal spectrogram and the small-region stored signal spectrogram by referring to the table of degree of similarity among small-region codes.

12. The detection method of a segment including a specific sound signal according to claim 11, further comprising;
an index generation step which generates an index in which appearance time points in the stored signal are grouped by using the small-region codes, wherein:
the similar small-region spectrogram detection method refers to the index using the small-region code similar to the reference signal small-region code selected by referring to the table of degree of similarity among small-region codes, and detects the small-region stored spectrogram having the small-region code as the small-region stored signal spectrogram similar to the small-region reference signal spectrogram.

13. A computer program product stored on a non-transitory computer readable medium of a computer of a detection system, comprising:
reference signal spectrogram division instructions which divide a reference signal spectrogram that is a time-frequency spectrogram of the reference signal into spectrograms of small-regions that are small-region reference signal spectrograms;
small-region reference signal spectrogram coding instructions in which the small-region reference signal spectrogram is encoded to a reference signal small-region code;
small-region stored signal spectrogram coding instructions in which a small-region stored signal spectrogram that is a spectrogram of a small-region in a stored signal spectrogram which is a time-frequency spectrogram of the stored signal, is encoded and a stored signal small-region code is obtained;

similar small-region spectrogram detection instructions in which a small-region stored signal spectrogram similar to the small-region reference signal spectrogram is detected respectively from the small-region stored signal spectrogram based on a degree of similarity of a code; and degree of segment similarity calculation instructions which, by using a degree of small-region similarity between the small-region reference signal spectrogram and the small-region stored signal spectrogram which is similar to the small-region reference signal spectrogram and which is detected by the similar small-region spectrogram detection instructions, calculate a degree of similarity between the segment of the stored signal including the small-region stored signal spectrogram which is similar to the small-region reference signal spectrogram and the reference signal.

* * * * *